(12) United States Patent
Hu (10) Patent No.: US 11,286,113 B2
(45) Date of Patent: Mar. 29, 2022

(54) HANDLING METHOD, HANDLING DEVICE AND HANDLING SYSTEM

(71) Applicant: BEIJING GEEKPLUS TECHNOLOGY CO., LTD., Beijing (CN)

(72) Inventor: Bin Hu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 16 days.

(21) Appl. No.: 16/616,412

(22) PCT Filed: Apr. 3, 2019

(86) PCT No.: PCT/CN2019/081298
§ 371 (c)(1),
(2) Date: Nov. 22, 2019

(87) PCT Pub. No.: WO2019/201094
PCT Pub. Date: Oct. 24, 2019

(65) Prior Publication Data
US 2020/0156869 A1 May 21, 2020

(30) Foreign Application Priority Data
Apr. 18, 2018 (CN) .......................... 201810352344.7

(51) Int. Cl.
*G06F 7/00* (2006.01)
*B65G 1/137* (2006.01)
(Continued)

(52) U.S. Cl.
CPC ............ *B65G 1/1373* (2013.01); *B66F 9/063* (2013.01); *G05D 1/0212* (2013.01)

(58) Field of Classification Search
CPC ......... B65G 1/1373; B65G 1/04; B66F 9/063; G05D 1/0212; G05D 1/0261;
(Continued)

(56) References Cited

U.S. PATENT DOCUMENTS 3,531,705 A * 9/1970 Rosin .................. B65G 1/0421
318/567
10,399,772 B1 * 9/2019 Brazeau ................... B65G 1/10
(Continued)

FOREIGN PATENT DOCUMENTS

CN      205150884 U      4/2016
CN      105692021 A  *   6/2016
(Continued)

OTHER PUBLICATIONS

International Search Report for PCT/CN2019/081298 dated Jul. 9, 2019, with English Translation.
(Continued)

*Primary Examiner* — Yolanda R Cumbess
(74) *Attorney, Agent, or Firm* — Arent Fox LLP (57) ABSTRACT

Disclosed are a handling method, a handling device, and a handling system. The handling method includes: advancing toward a position of the target object at a first speed according to a navigation route; advancing toward the position of the target object at a second speed in response to the distance between a current position of the handling device and the position of the target object becoming less than or equal to a first distance, the second speed being less than the first speed; identifying a mark point on the target object when advancing at the second speed, and aligning with the target object according to the mark point of the target object in response to having identified the mark point on the target object; stopping advancing and lifting up the target object after aligning with the target object; and (Continued)

advancing toward a preset position after lifting up the target object.

19 Claims, 7 Drawing Sheets

(51) Int. Cl.
    *B66F 9/06*     (2006.01)
    *G05D 1/02*     (2020.01)

(58) Field of Classification Search
    CPC ............... G05D 1/0225; G05D 1/0246; G05D 2201/0216; G06Q 10/087
    USPC .................................. 700/213–217, 228–229
    See application file for complete search history.

(56) References Cited

U.S. PATENT DOCUMENTS

| | | | |
|---|---|---|---|
| 2016/0145045 A1* | 5/2016 | Mountz | B65G 1/1378 700/216 |
| 2016/0221755 A1 | 8/2016 | Sullivan et al. | |
| 2017/0357270 A1* | 12/2017 | Russell | G05D 1/0242 |

FOREIGN PATENT DOCUMENTS

| | | |
|---|---|---|
| CN | 105692021 A | 6/2016 |
| CN | 205397170 U | 7/2016 |
| CN | 105858045 A | 8/2016 |
| CN | 206032359 U | 3/2017 |
| CN | 106956883 A | 7/2017 |
| CN | 206842284 U | 1/2018 |
| CN | 107899957 A | 4/2018 |
| CN | 108792384 A | 11/2018 |
| EP | 2 417 044 A1 | 2/2012 |
| JP | 2010033259 A | 2/2010 |
| JP | 2017228129 A | 12/2017 |
| JP | 2018513503 A | 5/2018 |
| KR | 20070048585 A | 5/2007 |
| KR | 20170134350 A | 12/2017 |
| WO | 2010/118412 A1 | 10/2010 |
| WO | 2016/125001 A1 | 8/2016 |
| WO | 2016/124999 A1 | 11/2016 |
| WO | 2017207978 A1 | 12/2017 |

OTHER PUBLICATIONS

Extended European Search Report issued for European Patent Application No. 19788734.2, dated Nov. 19, 2021.

* cited by examiner

HANDLING METHOD, HANDLING DEVICE AND HANDLING SYSTEM

CROSS-REFERENCE TO RELATED APPLICATIONS

This application is United States National Stage Application of co-pending International Patent Application Number PCT/CN2019/081298, filed on Apr. 3, 2019, which claims the priority of China patent application No. 201810352344.7 filed on Apr. 18, 2018 to the China National Intellectual Property Administration (CNIPA), the contents of which are hereby incorporated herein by reference in their entirety.

TECHNICAL FIELD

The present disclosure relates to the field of intelligent logistics, and in particular relates to a handling method, a handling device, and a handling system.

BACKGROUND

The rapid development of e-commerce has brought unprecedented development opportunities to the express delivery industry, while it also poses serious challenges to express delivery services. The traditional manual matrix sorting method has long been unable to satisfy the high-efficiency and low-cost requirements of the express delivery industry, and it faces problems such as high error rate, high labor intensity, low space utilization, and the difficulty of management. As a result, more and more courier companies are being to use automation equipment.

As an application, more and more logistics robots are employed to automatically handle shelves in a warehouse. In particular, a shelf containing items needs to be placed at a specific coordinate position in the warehouse, and a logistics robot may advance to the coordinate position (i.e., right under the shelf) according to a navigation route and then stop advancing when it arrives at this position. The logistics robot first may identify the shelf, then lift up the shelf, and finally handle the shelf to a workstation, where a workstation staff member may pick items from the shelf or replenish new items to the shelf.

SUMMARY

In actual working conditions, a shelf often cannot be accurately placed at a preset coordinate position (for example, the shelf may be subjected to a certain deviation after it is hit), such that a logistics robot the logistics robot needs to advance again and search for the shelf if the logistics robot stops after arriving at the coordinate position of the shelf but fails to identify the shelf. The process during which the logistics robot first stops and then searches for the shelves will prolong the operating time of the logistics robot for handling the shelves, thus affecting the efficiency of handling the shelves.

Therefore, there is an urgent need for a new method of handling items.

The present disclosure provides a handling method, a handling device, and a handling system to at least partially solve the problem present in the related art.

The present disclosure provides a handling method applied to a handling device. The handling method may include the following operations:

advancing toward a position of a target object at a first speed according to a navigation route;

advancing toward a position of the target object at a second speed when a distance between a current position of the handling device and a position of the target object is less than or equal to a first distance, the second speed being less than the first speed;

identifying a mark point on the target object when advancing at the second speed, and aligning with the target object according to the mark point of the target object in response to having identified the mark point on the target object;

stopping advancing and lifting the target object after aligning with the target object; and advancing toward a preset position after lifting up the target object.

The present disclosure further provides a handling device, including:

a walking mechanism, configured to allow the handling device to advance;

a docking head, configured for docking with the target object;

a lifting mechanism, connected to the docking head, and configured to lift the docking head and further lift up the target object after the docking head is engaged with the target object;

a target identification assembly, configured for identifying a mark point on the target object; and a control module, configure for:

controlling the walking mechanism to advance toward a position of the target object at the first speed according to the navigation route;

controlling the walking mechanism to advance toward the position of the target object at the second speed in response to a distance between the current position of the handling device and the position of the target object becoming less than a first distance, and starting up the target identification assembly, where the second speed is less than the first speed;

controlling the target identification assembly to identify the mark point on the target object when the walking mechanism is advancing at the second speed;

in response to the target identification assembly having identified the mark point of the target object, controlling the walking mechanism to advance according to the mark point of the target object so as to make the handling device be aligned with the target object;

controlling the walking mechanism to stop advancing after the handling device is aligned with the target object, and further controlling the lifting mechanism to lift the docking head and continue to lift up the target object after the docking head is engaged with the target object; and controlling the walking mechanism to advance toward the preset position after the lifting mechanism lifts up the target object.

The present disclosure further provides a handling system, including:

a target object configured for storing an item and a handling device configured for handling the target object, where the handling device is operative to:

advance toward a position of the target object at the first speed according to a navigation route;

advance toward the position of the target object at a second speed in response to the distance between the current position of the handling device and the position of the target object becoming less than or equal to the first distance, where the second speed is less than the first speed;

identify the mark point on the target object when advancing at the second speed in response to having identified the mark point on the target object, and align with the target object according to the mark point of the target object;

stop advancing and lift the target object after aligning with the target object; and advance toward the preset position after lifting up the target object.

According to the handling method, the handling device and the handling system provided by the embodiments of the present disclosure, the handling device is controlled to move at different speeds so that the handling device needs not to stop during the process of handling the target object. Consequently, the time for the handling device to search and handle the target object is reduced, and the efficiency for handling items is improved.

DETAILED DESCRIPTION

The disclosure will be described below in conjunction with the drawings and embodiments. It should be understood that, the specific embodiments set forth below are merely intended to illustrate and not to limit the present disclosure. In addition, convenience of description, only part, not all, of arrangements related to the present disclosure are illustrated in the drawings.

Figure 1:
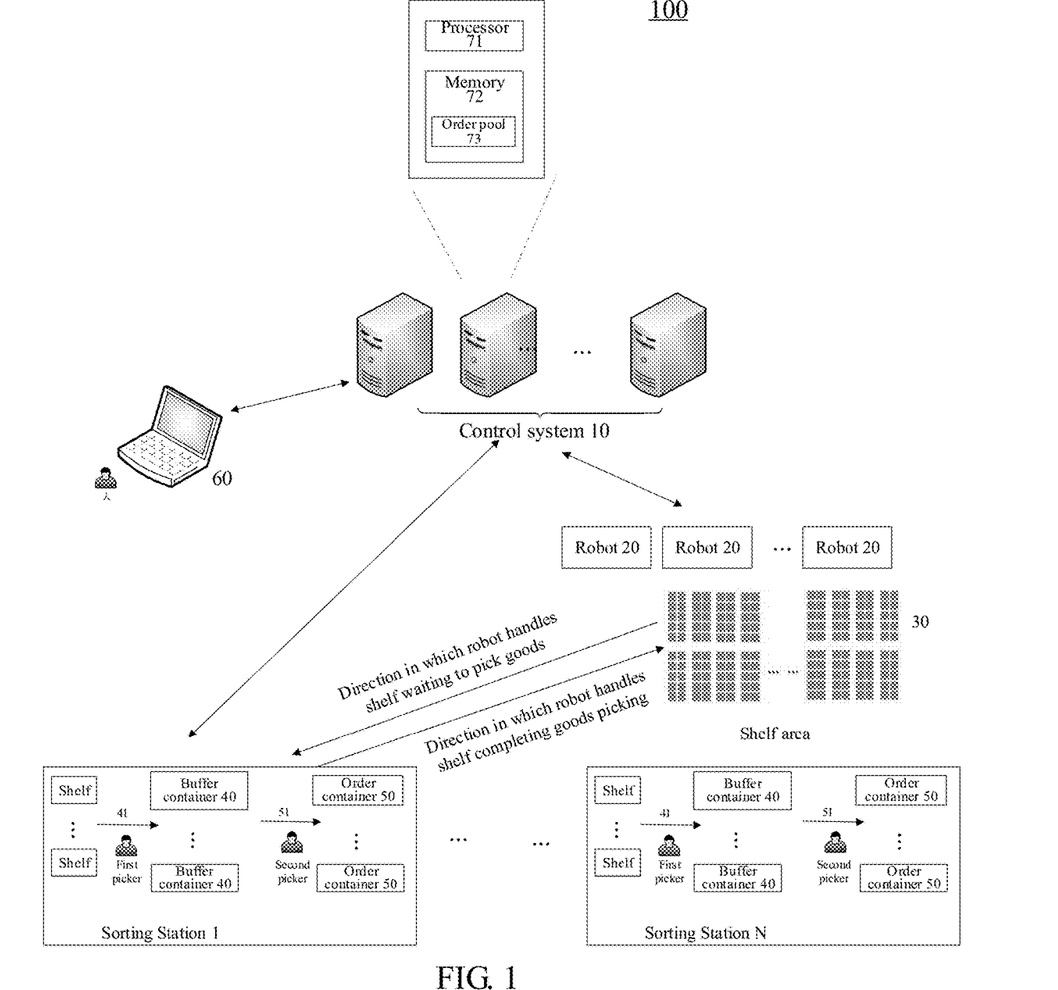
FIG. 1 is a schematic diagram of a working scenario of a goods sorting system 100 provided in an embodiment according to the present disclosure.

FIG. 1 illustrates a schematic diagram of a working scenario of a goods picking system 100 provided by an embodiment of the present disclosure.

The goods picking system 100 includes a control system 10, a handling device 20 (such as a mobile robot), an inventory container 30 (such as a shelf), a buffer container 40, and an order container 50.

The control system 10 may be a computing platform composed of components such as a processor, a memory, a software, and network. The control system 10 may provide electronic shopping services for an e-commerce individual user. Alternatively, the control system may interface to an e-commerce service system, which provides e-commerce shopping services for the e-commerce individual users. The control system 10 may include one or more servers, and may be of a centralized control architecture or a distributed computing architecture. The server may include a processor 71 and a memory 72 including an order pool 73 therein.

The electronic device 60 used by the user is connected to the control system 10 by the network, or the electronic device 60 used by the user is connected to the e-commerce service system interfaced to the control system by the network. The electronic device 60 is typically provided with an electronic shopping application APP, the user places an order via a shopping user interface of the electronic shopping application APP, so that the order is transmitted to the control system 10 via the network, or the order is transmitted to the e-commerce service system via the network and then transmitted to the control system 10 via the e-commerce server system, and the control system 10 may store the order in the order pool 73.

The control system 10 is operable to communicate with the handling device 20, an auxiliary display device or an electronic device 60 at a sorting station S, a goods picker, or other automated goods sorting devices. The communication may be implemented as e.g., wireless or wired communication.

Under the control of the control system 10, the handling device 20 is operative to perform a handling task. For example, the handling device 20 may move to a position under a target shelf 30, lift up the target shelf 30, and handle the target shelf 30 to the assigned sorting station S. In an example, each of the mobile robots may have a lifting mechanism and it may further have an autonomous navigation function whereby the handling device 20 may drive to the position under the shelf and lift up the whole shelf using the lifting mechanism.

A goods inventory area G includes a plurality of inventory containers 30 therein, such as shelves, on which various goods are placed, for example, a shelf as found in a supermarket with various goods placed thereon. The goods in the inventory area can be put onto shelves or be unloaded from the shelves by the loading personnel.

In an example, the shelf is square-shaped, and a bottom end of the shelf is provided with four legs that are symmetric in position and have a height higher than that of the mobile robot, so that the robot is allowed pass through the bottom of the shelf. Furthermore, the various shelves may be arranged as a shelf matrix composed of multiple rows and columns, where blank rows/columns form passages for mobile robot to move through.

The buffer containers 40 and the order containers 50 may each be arranged in one of the picking stations S. The buffer container 40 may temporarily store goods picked out from the shelves, and then the goods temporarily stored by the buffer container 40 may be picked out and put into the corresponding order container 50 according to the order information. Each of the picking station S may be further provided with a sowing wall, which is typically easily movable, for example, the sowing wall may be provided with wheels. The order containers 50 may be disposed on different sowing walls.

In an example, the buffer containers 40 and the order containers 50 may each include a label, which may be a conventional paper label, such as a barcode, or an electronic label, such as a radio frequency label RFID. The storage containers 40 and the order containers 50 may or may not be the same in shape.

In actually picking goods, the control system 10 obtains an order to be processed from the order pool and distributes the order to be processed to a picking station S; based on the order information, the control system 10 determines the target handling shelf 30, designates a mobile robot to handle the target shelf 30 to the picking station S, and the picking staff member or some other automated picking device picks the goods from the target shelf 30 according to the prompt information from the control system 10, and places the picked goods into the order container 40 corresponding to the order. The order container 40 may for example be placed on the sowing wall, so that the order container that has completed the goods picking operation can then be handled to a packing station for packing.

It should be noted that the handling method, the handling device, and the handling system in the embodiments of the present disclosure are not only suitable for the above-mentioned goods picking scenario, but also suitable for other application scenarios where the handling device is required to handle goods, such as the goods picking scenario and the handling scenario.

Figure 2:
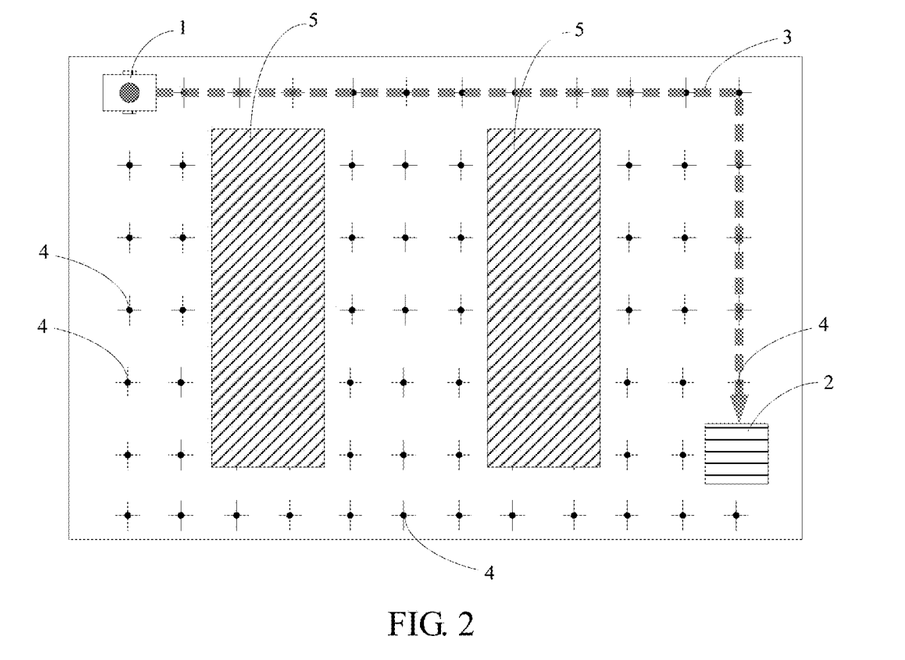
FIG. 2 is a schematic diagram of an item handling platform provided in an embodiment according to the present disclosure.

Referring to FIG. 2, a schematic diagram of an item handling platform is shown. The item handling platform includes a handling device 1 and a target object (for example, a shelf 2) handled by the handling device, and the handling device 1 allows the shelf 2 to be handled from one place to another in the item handling platform. Between each of the handling devices 1 and the shelves to be handled, there is a navigation route 3 including one or more navigation points 4 configured for identifying the position coordinates. Besides, there are one or more obstacle areas 5 in the item handling platform. For example, the obstacle area 5 is the area where the shelves 2 are located, and the navigation route 3 of the handling device 1 may be such set as not to pass through the obstacle areas 5. It should be noted that the handling device 1 may perform navigation by using any one of the navigation methods in the related art, such as two-dimensional code visualized navigation, inertial navigation, simultaneous localization and mapping (SLAM) navigation, or patrol navigation, and may be a combination of any of a plurality of navigation methods in the related art for navigation, such as two-dimensional code visualized navigation combined with inertial navigation or two-dimensional code visual navigation combined with SLAM navigation. The technical solution of the embodiment of the present disclosure is not limited to the navigation methods.

Figure 3:
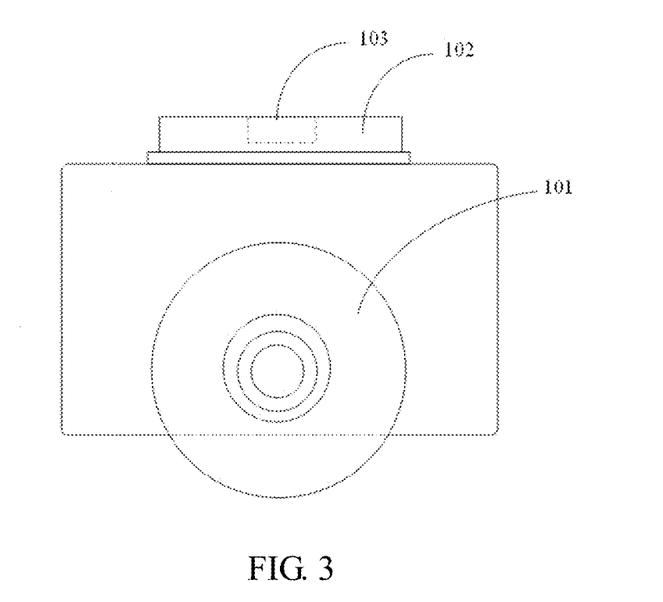
FIG. 3 is a schematic diagram illustrating the structure of a handling device provided in an embodiment according to the present disclosure.

Referring to FIG. 3, the handling device 1 may include a walking mechanism 101. The walking mechanism 101 enables the handling device 1 to move in a working space. In addition, the handling device 1 may further include a lifting mechanism and docking head 102, and when the shelf 2 is identified and aligned, the handling device 1 may lift the shelf 2 using the lifting mechanism. For simplicity, FIG. 3 only illustrates a single handling device 1, and the item handling platform may include any appropriate number of the handling device 1. An object identification device 103 on the handling device 1 may effectively identify the shelf 2 when the handling device 1 approaches the shelf 2. In addition, the handling device 1 further includes a navigation identification assembly (not shown in FIG. 3) configured to identify the navigation point 4 and a control module (not shown in FIG. 3) that controls the whole handling device 1 to advance and to be navigated.

Figure 4:
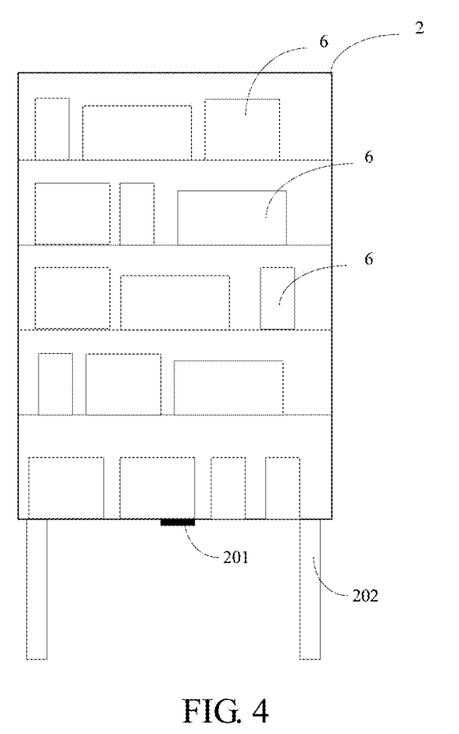
FIG. 4 is a schematic diagram illustrating the structure of a shelf loaded with items to be handled provided in an embodiment according to the present disclosure.

FIG. 4 is a schematic view of the shelf 2 storing items 6 according to an embodiment of the present disclosure. In a particular embodiment, the shelf includes a plurality of partitions, each of which is able to accommodate the item 6. In addition, in a particular embodiment, the item 6 may also be hung on a hook or pole within the shelf 2 or on the shelf 2. The item 6 may be placed inside the shelf or on an external surface of the shelf in any suitable manner. The shelf 2 can be rolled, carried or otherwise handled by the handling device 1. To facilitate the handling of the shelf 2 by the handling device 1, the shelf 2 includes one or more shelf frame member 202 and a shelf mark point 201 configured to identify the identity of the shelf.

The item 6 represents any item suitable to be stored and sorted or transported in an automatic inventory, warehouse, manufacturing and/or part processing system, and could be of any material, whether living or inanimate. As an example, the item 6 may represent the goods stored in the warehouse. The handling device 1 may handle a shelf 2 specified by the control system and the shelf 2 contains a particular item 6 associated with a customer order to be packaged for delivery to a customer or elsewhere.

As another example, the item 6 may represent baggage stored in a baggage facility at an airport. The handling device 1 may get back a shelf 2 which contains the baggage to be transported or tracked. This may include selecting a particular baggage item for explosives screening, handling baggage items associated with a flight whose boarding gate has been changed or removing baggage items belonging to a passenger who has missed a flight.

As another example, the item 6 may represent each of the assemblies in a manufacturing toolkit. More specifically, these assemblies may represent assemblies intended to be included in an assembled product, such as computer assemblies for customizing a computer system. In such an embodiment, the handling device 1 may retrieve particular assemblies identified by specifications related to a customer order.

As another example, the item 6 may represent a person. For example, in a hospital scenario, the shelf 2 may represent a bed where there is a particular patient. Therefore, the item storage system may be configured as a safe and effective system for moving hospital beds and the system decreases the possibility of injury to a patient and reduces the possibility of human-caused errors. In summary, the item 6 may be any suitable item stored by the shelf 2 in any suitable form.

In operation, the handling device 1 may move in the work space, and when lifting up the shelf 2, the handling device 1 may handle the shelf 2 in the work space. Based on a received command, the handling device 1 may determine a destination of the handling device 1. For example, in a particular embodiment, the handling device 1 may receive information of the destination of the handling device 1 from the control system. The handling device 1 may receive the information via a wireless interface, a wired connection or any other suitable assembly, so as to be in communication with the control system. In general, the handling device 1 may be controlled, in whole or in part, to any desired place based on command from the control system.

As an example, the rest of the description assumes that the handling device 1 receives commands, data, instructions or information constructed in any suitable form in a wireless manner. These commands are used for identifying a particular shelf 2 to enable the handling device 1 to move to a destination to handle the shelf 2. The handling device 1 may move the handling device 1 and/or the shelf 2 by a motor or wheel on the walking mechanism 101.

Figure 5:
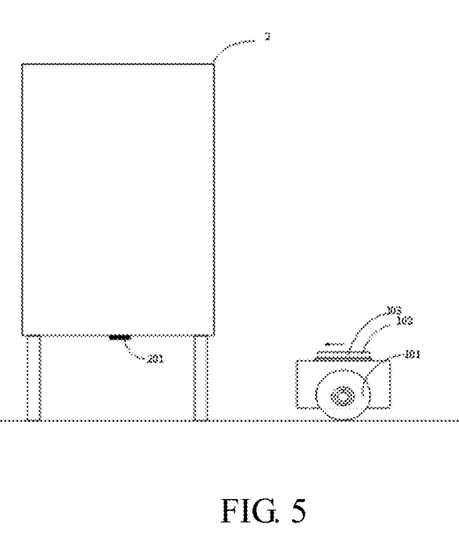
FIG. 5 is a schematic diagram of a handling device posed close to a shelf provided in an embodiment according to the present disclosure.
Figure 6:
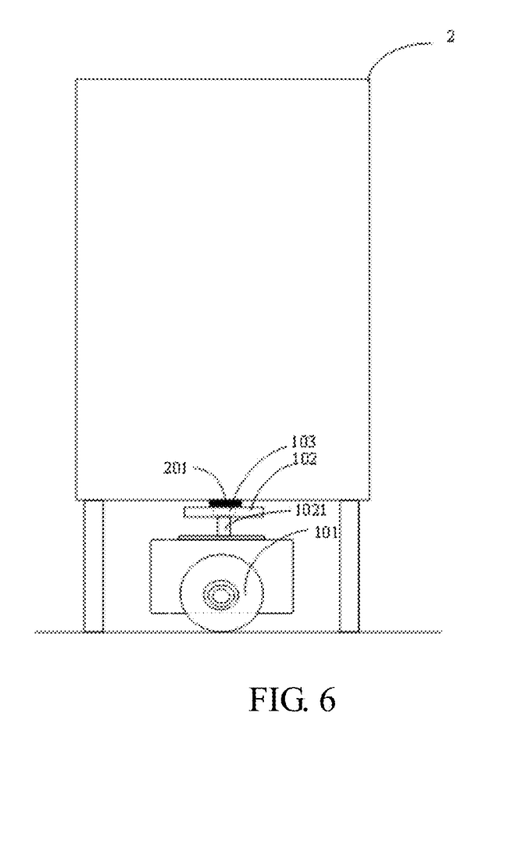
FIG. 6 is a schematic diagram of a handling device handling a shelf provided in an embodiment according to the present disclosure.

In response to the received command, the handling device 1 moves to a storage position (referring to FIGS. 5 and 6) identified by the command, and the handling device 1 may be docked with the identified shelf 2. The handling device 1 may be docked with the shelf 2 in any suitable manner so that the shelf 2 is coupled to and/or supported by the handling device 1 when the handling device 1 is docked with the shelf 2. For example, in a particular embodiment, the handling device 1 is docked with the shelf 2 under an inventory frame according to the self-positioning of the handling device 1 and raises a lift portion 1021 of the handling device 1 until the lifting mechanism 1021 lifts up the shelf 2 off the ground. In such an embodiment, when docked with the shelf 2, the handling device 1 may support all or part of the weight of the shelf 2. In addition, in a particular embodiment, one or more assemblies of the handling device 1 may grab one or more assemblies of the shelf to grasp, to be connected to, to be interlocked with or otherwise interact with the one or more assemblies of the shelf to form a physical connection between the handling device 1 and the shelf 2. As the handling device 1 is handling the shelf 2, a posture of the shelf 2 may be adjusted by rotating.

In a practical application scenario, each of the shelves 2 is provided with a specific position coordinate when stored, and as the shelf 2 is placed according to the specified coordinate, a certain deviation usually exists between the actual placement point of the shelf 2 and the position coordinate where the shelf 2 is supposed to be placed. When the handling device 1 searches the shelf 2 according to the position coordinate where the shelf 2 is supposed to be placed, then due to the position deviation, the mobile handling device 1 needs to stop to repeatedly search the position of the shelf 2, leading to a waste of time and an inefficiency for handling the shelf.

Figure 7:
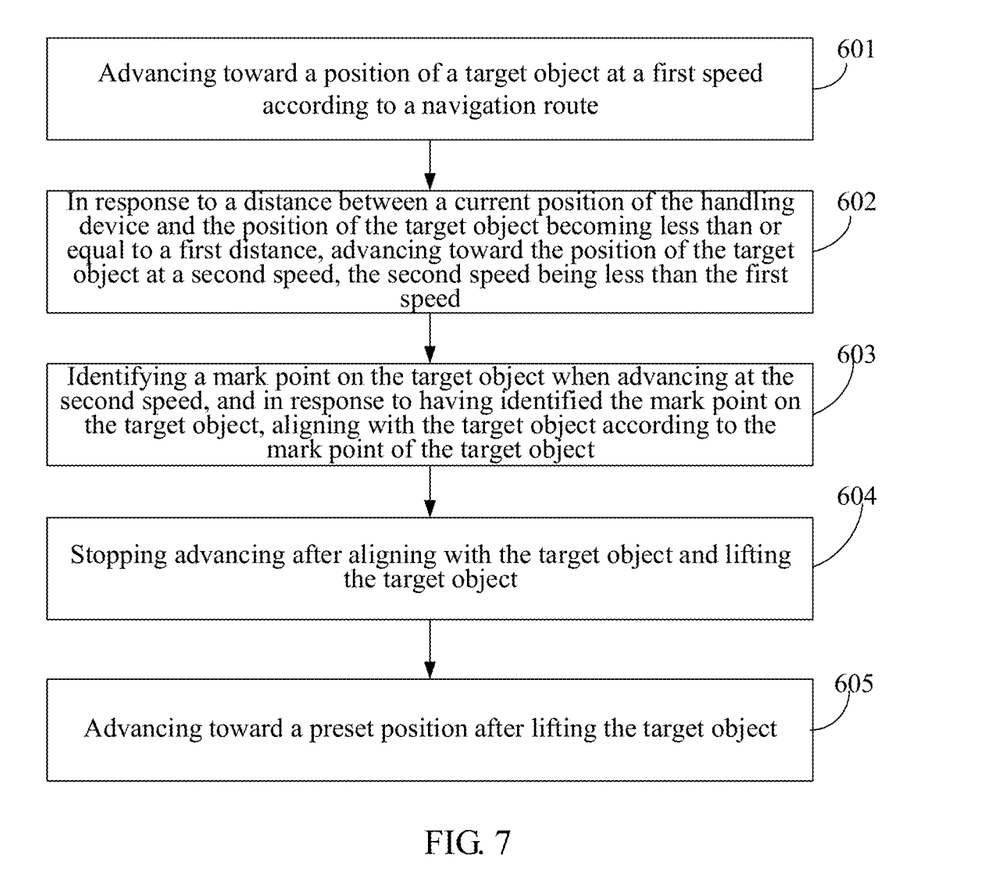
FIG. 7 is a flow chart of a handling method provided in an embodiment according to the present disclosure.

Referring to FIG. 7, an embodiment of the present disclosure discloses a handling method, applied to the handling device 1 and including the following steps.

In step 601, the handling method includes advancing toward the position of the target object at the first speed according to the navigation route;

After the handling device 1 obtains the handling task at a start point, the position coordinates of the target object (such as the shelf 2) may be obtained from the handling task, and the handling device 1 may obtain the navigation path 3 including a plurality of navigation points 4 thereon by obtaining the current position coordinate of the handling device and the position coordinate of the target object. In order to approach the target object as quickly as possible, the handling device 1 may approach the target position at the first speed. The first speed may be the normal moving speed of the handling device 1, or the speed set according to the practical need, and by setting the first speed, the handling device 1 may spend less time in approaching the target position.

In step 602, the handling method includes advancing toward the position of the target object at the second speed in response to the distance between the current position of the handling device and the position of the target object becoming less than or equal to the first distance, where the second speed is less than the first speed;

The first speed is usually a faster speed, and when the faster speed is used to approach the target object, it is usually difficult to accurately identify the target object because the handling device is moving too fast. To serve this purpose, the handling device 1 may acquire the distance between the current position and the target position (such as a theoretical coordinate value of the shelf 2) in real time, and when a value of the distance is less than that of the first distance, a speed of the handling device 1 is changed to a second speed, the second speed being a speed for facilitating identification for the target object, and it is to be understand that the second speed value is less than that of the first speed.

In step 603, the handling method includes identifying the mark point on the target object when advancing at the second speed, and aligning with the target object according to the mark point of the target object in response to having identified the mark point on the target object;

When the value of the distance between the handling device 1 and the target object is becoming less than or equal to that of the first distance, it is indicated that the handling device 1 is already close to the target object, and the target identification assembly 103 on the handling device 1 may be started up at this moment to identify the mark point on the target object.

As an implementation, when advancing at the second speed, the target identification assembly 103 on the handling device is started up to trigger the target identification assembly 103 to identify the mark point on the target object. Certainly, as another implementation, the object identification assembly 103 may be started up when the handling device starts to advance according to the navigation route.

The object identification assembly 103 may be a plurality of types of devices, for example, the object identification assembly 103 may be a camera device, correspondingly, the mark point may be a graphic mark (such as a two-dimensional code), and the object identification assembly 103 may also be an RFID signal receiver, and in this case, the mark point may be an RFID label. That is, the target identification assembly 103 may be any device or apparatus capable of identifying the target object. The device type of the object identification assembly 103 is not limited here.

In step 604, the handling method includes stopping advancing and lifting the target object after aligning with the target object; and In step 605, the handling method includes advancing toward the preset position after lifting up the target object.

The navigation route includes a plurality of navigation points.

The handling device 1 may determine whether the distance value between the current position of the handling device 1 and the position of the target object is less than or equal to the first distance value by the following manners.

One of the manners is to determine whether the handling device 1 has reached a preset navigation point on the navigation route, and in response to determining that the handling device 1 has reached the preset navigation point on the navigation route, it is determined that the distance value between the current position of the handling device 1 and the position of the target object is less than or equal to the value of first distance.

Another of the manners is to determine whether the handling device 1 reaches the preset navigation point on the navigation route, and in response to determining that the handling device 1 reaches the preset navigation point on the navigation route, measure a distance of the handling device 1 away from the preset navigation point on the navigation route using a self-navigation device on the handling device 1. And when the distance of the handling device 1 away from the preset navigation point on the navigation route reaches a preset length, it is determined that the distance value between the current position of the handling device 1 and the position of the target object is less than or equal to the value of the first distance.

In an alternative manner, the preset navigation point may be the last one of all navigation points on the navigation route.

When no mark point is identified on the target object, the handling device 1 may automatically return to a designated position.

Further, the handling device 1 may also report to the control system, more specifically for example the server in the control system, an event that no mark point on the target object is identified.

Figure 8:
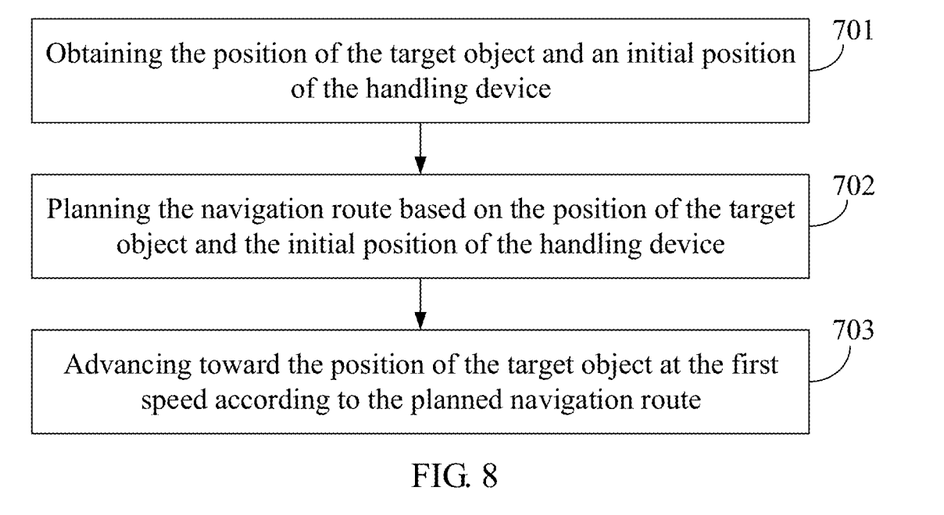
FIG. 8 is a flow chart of another handling method provided in an embodiment according to the present disclosure.

The handling system is provided with a plurality of handling devices 1, each of which needs to be operated according to a specific route, so that the handling efficiency of all the handling devices 1 on the entire handling system is maximized. Referring to FIG. 8, according to a specific implementation of the embodiment of the present disclosure, the process of acquiring the target position of the target object and approaching the target position in the first speed include the following steps.

In step 701, the process includes obtaining the position of the target object and an initial position of the handling device;

In step 702, the process includes planning the navigation route 3 based on the position of the target object and the initial position of the handling device; and In step 703, the process includes advancing toward the position of the target object at the first speed based on the planned navigation route.

Figure 9:
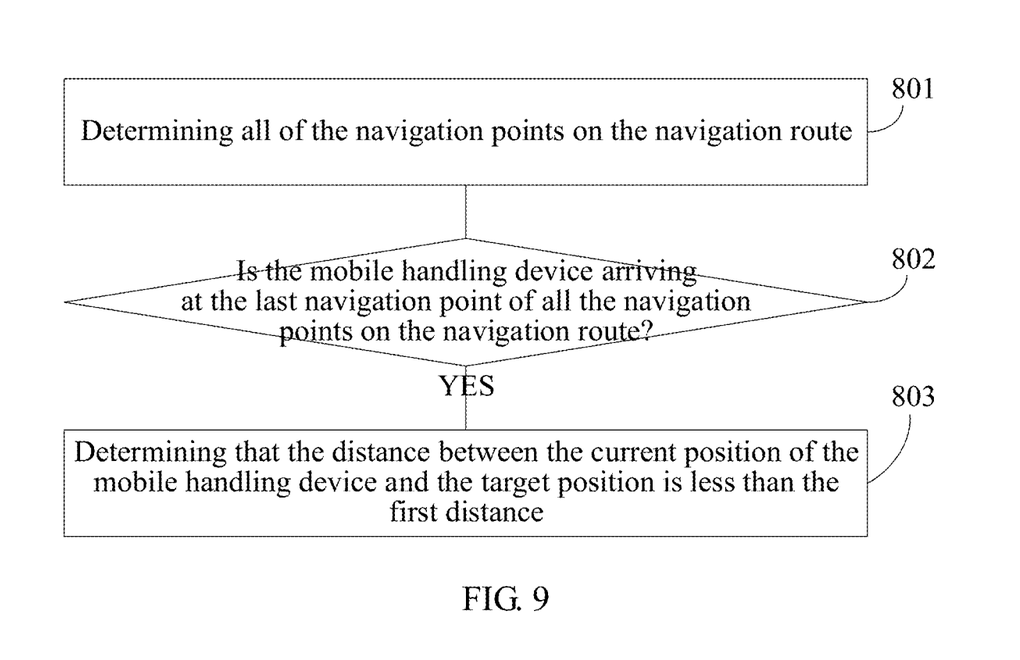
FIG. 9 is a flow chart of yet another handling method provided in an embodiment according to the present disclosure.

After the navigation route 3 is completed, the handling device 1 may identify the navigation point 4 in the handling system by the navigation identification assembly of the handling device 1. Referring to FIG. 9, according to a specific implementation of the embodiment of the present disclosure, the method further includes the following steps.

In step 801, the handling method includes determining all the navigation points 4 on the navigation route 3.

As a manner of determining whether the handling device 1 is close to the target object, it may be performed according to the position of the navigation point on the navigation route 3, and referring to FIG. 9, according to a specific implementation of the embodiment of the present disclosure, the method further includes the following steps.

In step 802, the handling method includes whether the handling device 1 reaches the last navigation point 4 of all navigation points 4 on the navigation route 3. And In step 803, in response to determining that the handling device 1 reaches the last navigation point 4 of all navigation points 4 on the navigation route 3, it is determined that the value of the distance between the current position of the handling device and the target position is less than or equal to the value of the first distance.

By determining the last navigation point, it can be quickly determined whether the handling device 1 is approaching the target object.

In the case of a large distance between the navigation points, after the handling device 1 reaches the last navigation point, it usually needs to advance a certain distance to reach the target object. In order to reduce the time for the handling device 1 to identify the target object, referring to FIG. 10, according to a specific implementation of the embodiment of the present disclosure, after step 802 of FIG. 9 (reproduced in FIG. 10), the method further includes the following steps.

Figure 10:
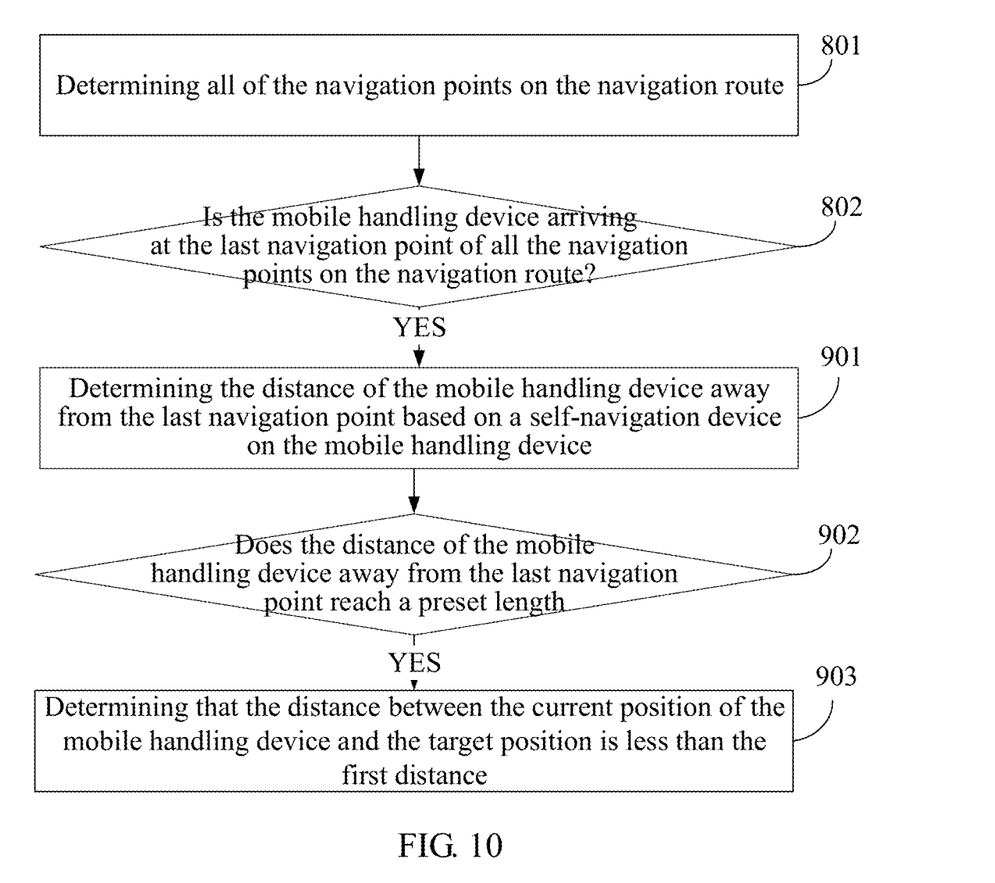
FIG. 10 is a flow chart of still another handling method provided in an embodiment according to the present disclosure.

In step 901, the handling method includes determining the distance of the handling device 1 away from the last navigation point 4 based on the self-navigation device on the handling device 1.

The self-navigation device on the handling device 1 may be a plurality of types of devices such as a gyroscope, an accelerometer, a GPS, and the like.

In step 902, the handling method includes determining whether the distance of the handling device 1 away from the last navigation point reaches the preset length.

The distance between the handling device 1 and the last navigation point can be set according to practical needs, and based on the distance, it is determined that handling device 1 is retarded to the second speed.

In step 903, after the distance of the handling device 1 away from the last navigation point 4 reaches the preset length, it is determined that the value of the distance of the current position of the handling device 1 and the target position is less than the value of the first distance.

When the target identification assembly 103 identified no mark point of the target object, the handling device 1 may continue to search the mark point by in-situ winding or the like.

When the target identification assembly 103 identifies the mark point of the target object but cannot read information of the mark point, the handling device 1 automatically returns to the designated place. In addition, the handling device 1 further reports to the control system the information of the target object that the information of the mark point cannot be read.

After the target identification assembly 103 identifies the mark point, the handling device 1 may read information in the mark point by using the target identification assembly 103. Based on the information, the handling device 1 may determine whether the information is consistent with a task information acquired by the handling device 1, and when the information is consistent with the task information acquired by the handling device 1, the handling device 1 moves the target object to the preset position.

As a case, the information of the mark point further stores an orientation information of the target object (such as a shelf), and the handling device needs to place the target object at a specific position in a preset orientation. To serve this purpose, the handling device 1 needs to determine the orientation information of the target object based on the information, and control the lifting mechanism on the handling device 1 to move the target object to a preset position in the preset orientation. For example, a steering mechanism on the handling device 1 may adjust an orientation of the lifting mechanism, so that the lifting mechanism moves the target object to a preset position according to a preset orientation.

In addition to the normal case, there may be a case where information is wrong, for example, the task information of the handling device 1 is inconsistent with the information in the mark point. When the information is not consistent with the task information acquired by the handling device 1, the handling device 1 reports to the control system the information of the target object.

In order to better identify the target object at the second moving speed, as an alternative case, the target identification assembly 103 has a first orientation when the handling device 1 is moving at the first speed. Since the target identification assembly 103 does not need to perform the identification task at this moment, the first orientation may be an orientation that facilitates storage and fixation for the target identification assembly 103.

When the handling device 1 moves at the second speed, the target identification assembly 103 moves at a first angular speed, and the target identification assembly 103 approximately faces toward the mark point of the target object at the moment, and by setting the first angular speed, the target identification assembly 103 is ensured to be still approximately facing toward the mark point of the target object as the handling device 1 is moving at the second speed.

In addition, an embodiment of the present disclosure provides a handling device 1, including:

a walking mechanism 101, configured to allow the handling device to advance;

a docking head 102, configured to be operable to couple to or support the target object when the handling device 1 is docked with the target object;

a target identification assembly 103, configured to identify a mark point 201 on the target object;

a lifting mechanism 1021, connected to the docking head 102, and configured to lift the docking head 102 and further lift up the target object after the docking head 102 is engaged with the target object;

a control module, configure for:

controlling the walking mechanism 101 to advance toward a position of the target object at a first speed according to the navigation route;

in response to a distance between the current position of the handling device 1 and the position of the target object becoming less than the first distance, controlling the walking mechanism 101 to advance toward the position of the target object at the second speed, and starting up the target identification assembly 103 on the handling device 1, the second speed being less than the first speed;

controlling the target identification assembly 103 to identify the mark point on the target object when the walking mechanism 101 is advancing at the second speed;

in response to the target identification assembly 103 having identified the mark point of the target object, controlling the walking mechanism to advance according to the mark point of the target object so as to make the handling device be aligned with the target object;

controlling the walking mechanism 101 to stop advancing after the handling device is aligned with the target object, and further controlling the lifting mechanism to lift the docking head 102 and continue to lift up the target object after the docking head 102 is engaged with the target object; and controlling the walking mechanism to advance toward the preset position after the lifting mechanism lifts up the target object.

The target identification assembly 103 on the handling device 1 may be started up and used to identify the mark point 201 on the target object when moving at the second speed.

When the target identification assembly 103 identifies the mark point 201, the speed of the handling device 1 may be controlled to be retarded to zero.

The target identification assembly may have a first orientation when the handling device is advancing at the first speed.

The target identification assembly is configured to move at the first angular speed when the handling device is advancing at the second speed.

In a third aspect, an embodiment of the present disclosure provide a system for storing items, including a target object for storing items and the handling device 1 for handling the target object, and the handling device 1 may be operative to:

advance toward the position of the target object at the first speed according to the navigation route;

advance toward the position of the target object at the second speed when the distance between the current position of the handling device and the position of the target object becomes less than or equal to the first distance, the second speed being less than the first speed;

identify a mark point on the target object when the walking mechanism 101 is advancing at the second speed;

stop advancing and lift the target object in response to having identified the mark point on the target object; and advance toward the preset position after lifting up the target object.

The target position of the target object may be obtained, and the handling device may approach the target position at the first speed.

In response to the distance between the current position of the handling device 1 and the position of the target object becoming less than the first distance, the handling device may approach the target position at the second speed.

The target identification assembly 103 on the mobile handling device may be started up to identify the mark point 201 on the target object when moving at the second speed.

In response to identifying the mark point 201, the target identification assembly 103 may retard the speed of the handling device 1 to zero, and further handles the target object to the preset position using the handling device 1.

According to the handling method, the handling device 1, and the system configured for storing items provided by the embodiments of the present disclosure, the handling device is controlled to move at different speeds so that the handling device needs not to stop during the process of handling the target object. Consequently, the time required for the handling device to search and handle the target object is reduced, and the efficiency for handling items is improved.

It may be understood that the term "one" should be regarded as "at least one" or "one or more". That is, the number of an element may be one in an embodiment and the number of the element may be multiple in another embodiment. The term "one" should not be considered to limit the number.

Since ordinal numbers such as "first" and "second" are used to describe various assemblies, the ordinal numbers are not intended to limit these assemblies herein. Those terms are only used to distinguish one assembly from another assembly. For example, a first assembly may be referred to as a second assembly, and similarly, the second assembly may be referred to as the first assembly, without departing from the concept of the present application. The term "and/or" used herein includes any or all combinations of one or more listed associated items.

Terms used herein are only used to describe embodiments and not intended to limit the present application. As used herein, a singular form is intended to include a plural from, unless clearly indicated in the context. In addition, it will be understood that the terms "including" and/or "having" used in the specification are intended to mean the existence of the described features, numbers, steps, operations, assemblies, elements or combinations thereof, without excluding the existence or addition of one or more other features, numbers, steps, operations, assemblies, elements, or combinations thereof.

The terms used herein, including technical and scientific terms, have the same meanings as the terms commonly understood by those skilled in the art, as long as the terms are not defined differently. It should be understood that the terms defined in the commonly used dictionaries have consistent meanings with the terms in the related art.

The foregoing merely depicts some specific embodiments of the present disclosure which however are not intended to limit the scope of the present disclosure. Within the technical scope disclosed by the present disclosure, any change or substitution easily conceivable to those skilled in the art should fall within the scope of protection of the present disclosure. Therefore, the scope of protection of the present disclosure is determined by the scope of protection of the claims.

What is claimed is:

1. A handling method, applied to a handling device, comprising:
    advancing toward a position of a target object at a first speed according to a navigation route;
    in response to a distance between a current position of the handling device and the position of the target object becoming less than or equal to a first distance, advancing toward the position of the target object at a second speed, the second speed being less than the first speed;
    identifying a mark point on the target object when advancing at the second speed, and in response to having identified the mark point on the target object, aligning with the target object according to the mark point of the target object, wherein when the handling device is advancing at the second speed, a target identification assembly of the handling device is moveable at a first angular speed to face toward the mark point on the target object;
    stopping advancing after aligning with the target object and lifting the target object; and
    advancing toward a preset position after lifting the target object.

2. The handling method of claim 1, wherein advancing toward the position of the target object at the first speed according to the navigation route comprises:
    obtaining the position of the target object and an initial position of the handling device;
    planning the navigation route based on the position of the target object and the initial position of the handling device; and
    advancing toward the position of the target object at the first speed according to the planned navigation route.

3. The handling method of claim 1, wherein the navigation route comprises a plurality of navigation points.

4. The handling method of claim 3, wherein "in response to a distance between a current position of the handling device and the position of the target object being less than or equal to a first distance" comprises:
    determining whether the handling device reaches a preset navigation point on the navigation route; and
    in response to determining that the handling device reaches the preset navigation point on the navigation route, determining that the distance between the current position of the handling device and the position of the target object is less than or equal to the first distance.

5. The handling method of claim 4, wherein the preset navigation point is the last navigation point of all navigation points on the navigation route.

6. The handling method of claim 3, wherein "in response to a distance between a current position of the handling device and the position of the target object being less than or equal to a first distance" comprises:
    determining whether the handling device reaches a preset navigation point on the navigation route;
    in response to determining that the handling device reaches the preset navigation point on the navigation route, measuring a distance of the handling device away from the preset navigation point on the navigation route using a self-navigation device on the handling device; and
    in response to the distance of the handling device away from the preset navigation point on the navigation route reaching a preset length, determining that the distance between the current position of the handling device and the position of the target object is less than or equal to the first distance.

7. The handling method of claim 6, wherein the preset navigation point is the last navigation point of all navigation points on the navigation route.

8. The handling method of claim 1, further comprising:
    in response to having identified no mark point on the target object, automatically returning to a designated position.

9. The handling method of claim 8, further comprising:
    reporting to a server an event that no mark point has been identified on the target object.

10. A handling device, comprising:
    a walking mechanism, configured to allow the handling device to advance;
    a lifting mechanism, configured to lift up a target object;
    a target identification assembly, configured for identifying a mark point on the target object; and
    a control module, configured for:
        controlling the walking mechanism to advance toward a position of the target object at a first speed according to a navigation route;
        in response to a distance between a current position of the handling device and the position of the target object becoming less than a first distance, controlling the walking mechanism to advance toward the position of the target object at a second speed, wherein the second speed is less than the first speed;
        controlling the target identification assembly to identify the mark point on the target object when the walking mechanism is advancing at the second speed;
        in response to the target identification assembly having identified the mark point of the target object, controlling the walking mechanism to advance according to the mark point of the target object so as to make the handling device be aligned with the target object;
        controlling the walking mechanism to stop advancing after the handling device is aligned with the target object, and further controlling the lifting mechanism to lift the target object; and
        controlling the walking mechanism to advance toward a preset position after the lifting mechanism lifts up the target object;
    wherein when the handling device is advancing at the second speed, the target identification assembly is configured to be movable at a first angular speed to face toward the mark point on the target object.

11. The handling device of claim 10, wherein
    when the handling device is advancing at the first speed, the target identification assembly has a first orientation.

12. The handling device of claim 10, wherein the control module is configured for:
    obtaining the position of the target object and an initial position of the handling device;
planning the navigation route based on the position of the target object and the initial position of the handling device; and
    controlling the walking mechanism to advance toward the position of the target object at the first speed according to the planned navigation route.

13. The handling device of claim 10, wherein the navigation route comprises a plurality of navigation points.

14. The handling device of claim 13, wherein the control module is configured for:

determining whether the handling device reaches a preset navigation point on the navigation route;

in response to determining that the handling device reaches the preset navigation point on the navigation route, measuring a distance of the handling device away from the preset navigation point on the navigation route using a self-navigation device on the handling device; and in response to the distance of the handling device away from the preset navigation point on the navigation route reaching a preset length, determining that the distance between the current position of the handling device and the position of the target object is less than or equal to the first distance.

15. The handling device of claim 13, wherein the control module is configured for:

determining whether the handling device reaches a preset navigation point on the navigation route;

in response to determining that the handling device reaches the preset navigation point on the navigation route, determining that the distance between the current position of the handling device and the position of the target object is less than or equal to the first distance.

16. The handling device of claim 15, wherein the preset navigation point is the last navigation point of all navigation points on the navigation route.

17. The handling device of claim 10, wherein the control module is further configured for:

in response to the target identification assembly having identified no mark point on the target object, controlling the walking mechanism to automatically return to a designated position.

18. The handling device of claim 17, wherein the control module is further configured for:

reporting to a server an event that no mark point has been identified on the target object.

19. A handling system, comprising a target object configured for storing an item and a handling device configured for handling the target object, wherein the handling device is operative to:

advance toward a position of the target object at a first speed according to a navigation route;

advance toward the position of the target object at a second speed in response to a distance between a current position of the handling device and the position of the target object becoming less than or equal to a first distance, the second speed being less than the first speed;

identify a mark point on the target object when advancing at the second speed, and align with the target object according to the mark point of the target object in response to having identified the mark point on the target object, wherein when the handling device is advancing at the second speed, a target identification assembly of the handling device is moveable at a first angular speed to face toward the mark point on the target object;

stop advancing and lift the target object after aligning with the target object; and advance toward a preset position after lifting up the target object.

* * * * *